US010340823B2

(12) United States Patent
Zheng

(10) Patent No.: US 10,340,823 B2
(45) Date of Patent: Jul. 2, 2019

(54) METHOD OF DETERMINING THE ROTOR POSITION OF A PERMANENT-MAGNET MOTOR

(71) Applicant: Dyson Technology Limited, Wiltshire (GB)

(72) Inventor: Libo Zheng, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 15/496,582

(22) Filed: Apr. 25, 2017

(65) Prior Publication Data
US 2017/0310255 A1 Oct. 26, 2017

(30) Foreign Application Priority Data
Apr. 26, 2016 (GB) .................................. 1607290.2

(51) Int. Cl.
*H02P 27/06* (2006.01)
*H02P 6/16* (2016.01)
*H02P 6/18* (2016.01)

(52) U.S. Cl.
CPC ............... *H02P 6/16* (2013.01); *H02P 6/186* (2013.01); *H02P 27/06* (2013.01)

(58) Field of Classification Search
USPC .......................... 318/400.06, 400.31, 400.32
See application file for complete search history.

(56) References Cited

U.S. PATENT DOCUMENTS

| 5,428,522 A | 6/1995 | Millner et al. |
| 5,936,378 A | 8/1999 | Iijima et al. |
| 2002/0190673 A1 | 12/2002 | Brenden et al. |

(Continued)

FOREIGN PATENT DOCUMENTS

| EP | 2 036 197 | 4/2010 |
| EP | 1 612 925 | 7/2014 |

(Continued)

OTHER PUBLICATIONS

Search Report dated Oct. 28, 2016, directed to GB Application No. 1607290.2; 1 page.

(Continued)

*Primary Examiner* — Jorge L Carrasquillo
(74) *Attorney, Agent, or Firm* — Morrison & Foerster LLP

(57) ABSTRACT

A method of determining the position of a rotor of a brushless permanent-magnet motor is provided. The phase winding is freewheeled when a phase current exceeds an upper threshold. The method further includes measuring a parameter that corresponds to either: (i) the magnitude of the phase current during or at the end of freewheeling when the phase winding is freewheeled for the fixed period of time, or (ii) the time interval between the start and end of freewheeling or the start and end of excitation when the phase winding is freewheeled until the phase current falls below the lower threshold. The measured parameter is then used to define a saturation threshold. The phase winding is subsequently excited and freewheeled in the same manner, and the parameter is measured again. The method then compares the measured parameter against the saturation threshold, and determines that the rotor is at a predetermined position.

12 Claims, 3 Drawing Sheets

(56) References Cited

U.S. PATENT DOCUMENTS

| | | |
|---|---|---|
| 2004/0212359 A1 | 10/2004 | Slater et al. |
| 2007/0159124 A1 | 7/2007 | Wasson et al. |
| 2007/0194734 A1 | 8/2007 | Weinmann |
| 2007/0241705 A1 | 10/2007 | Karwath |
| 2008/0224639 A1 | 9/2008 | Balsiger |
| 2009/0009115 A1 | 1/2009 | Grogg et al. |
| 2009/0289586 A1 | 11/2009 | Baba et al. |
| 2010/0001673 A1 | 1/2010 | Cardoletti et al. |
| 2010/0253268 A1* | 10/2010 | Marvelly ............... H02P 6/14 318/400.26 |
| 2012/0081050 A1* | 4/2012 | Dai ....................... H02P 6/002 318/400.14 |
| 2013/0127384 A1 | 5/2013 | Dai et al. |
| 2013/0234631 A1* | 9/2013 | Bateman ............... H02P 6/182 318/400.01 |
| 2013/0234633 A1* | 9/2013 | Bateman ............... H02P 6/18 318/400.06 |
| 2013/0234640 A1 | 9/2013 | Bateman et al. |
| 2014/0084822 A1 | 3/2014 | Ito et al. |
| 2014/0368140 A1 | 12/2014 | Celik |
| 2015/0340982 A1 | 11/2015 | Deflorio |
| 2017/0033719 A1* | 2/2017 | Rutledge ............... H02P 25/092 |
| 2017/0310256 A1 | 10/2017 | Zheng |

FOREIGN PATENT DOCUMENTS

| | | |
|---|---|---|
| GB | 2501370 | 10/2013 |
| JP | 8-23695 | 1/1996 |
| JP | 11-46492 | 2/1999 |
| JP | 3618240 | 2/2005 |
| JP | 5046826 | 10/2012 |
| JP | 5855967 | 2/2016 |
| WO | WO-2012/019669 | 2/2012 |
| WO | WO-2013/132249 | 9/2013 |
| WO | 2014/135903 | 9/2014 |

OTHER PUBLICATIONS

International Search Report and Written Opinion dated Dec. 5, 2017, directed to PCT Application No. GB2017/050902; 13 pages.

Zheng, U.S. Office Action dated May 9, 2018, directed to U.S. Appl. No. 15/496,553; 11 pages.

* cited by examiner

| Control Signals | | | Power Switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Excite Left-to-Right |
| 0 | 1 | 1 | 0 | 1 | 1 | 0 | Excite Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

Fig. 2

METHOD OF DETERMINING THE ROTOR POSITION OF A PERMANENT-MAGNET MOTOR

REFERENCE TO RELATED APPLICATION

This application claims the priority of United Kingdom Application No. 1607290.2, filed Apr. 26, 2016, the entire contents of which are incorporated herein by reference.

FIELD OF THE INVENTION

The present invention relates to a method of determining the rotor position of a permanent-magnet motor.

BACKGROUND OF THE INVENTION

Knowledge of the rotor position is essential in order to commutate the phase windings of a brushless motor at the correct times. A permanent-magnet motor will often include a Hall-effect sensor, which outputs a signal indicative of the rotor position. Although the component cost of the sensor is relatively cheap, integrating the sensor within the motor often complicates the design and manufacture of the motor. Additionally, the signal output by the sensor is often susceptible to electromagnetic noise generated within the motor.

Sensorless schemes for determining indirectly the position of a rotor are known. For a permanent-magnet motor, transitions in the polarity of the back EMF induced in a phase winding may be used to determine the rotor position. However, since the magnitude of the back EMF is proportional to the speed of the rotor, transitions in the polarity of the back EMF cannot always be reliably determined at low speeds.

SUMMARY OF THE INVENTION

Aspects of the present invention provides a method of determining the position of a rotor of a brushless permanent-magnet motor, the method comprising: exciting and freewheeling a phase winding of the motor, wherein the phase winding is freewheeled when a phase current exceeds an upper threshold and freewheeling comprises one of: (i) freewheeling for a fixed period of time, and (ii) freewheeling until the phase current falls below a lower threshold; measuring a parameter corresponding to one of: (i) the magnitude of the phase current during or at the end of freewheeling when the phase winding is freewheeled for the fixed period of time, and (ii) the time interval between the start and end of freewheeling or the start and end of excitation when the phase winding is freewheeled until the phase current falls below the lower threshold; using the measured parameter to define a saturation threshold; sequentially exciting and freewheeling the phase winding, wherein the phase winding is freewheeled when the phase current exceeds the upper threshold and freewheeling comprises one of: (i) freewheeling for the fixed period of time, and (ii) freewheeling until the phase current falls below the lower threshold; measuring the parameter corresponding to one of: (i) the magnitude of the phase current during or at the end of freewheeling when the phase winding is freewheeled for the fixed period of time, and (ii) the time interval between either the start and end of freewheeling or the start and end of excitation when the phase winding is freewheeled until the phase current falls below the lower threshold; comparing the measured parameter against the saturation threshold; and determining that the rotor is at a predetermined position when the measured parameter is less than the saturation threshold.

Aspects of the method of the present invention may not rely on the back EMF in order to determine the position of the rotor. Instead, the method makes use of the changes in the inductance of the phase winding that arise as the rotor rotates from one aligned position to the next aligned position. As the rotor approaches an aligned position, the inductance of the phase winding decreases. As a result, the rates at which the phase current rises during excitation and falls during freewheeling increase. By freewheeling the phase winding for a fixed period of time, the magnitude of the phase current at the end of the freewheeling will decrease as the rotor approaches the aligned position. Alternatively, by chopping the phase current between an upper threshold and a lower threshold, the time taken for the phase current to rise to the upper threshold during excitation will decrease as will the time taken for the phase current to fall to the lower threshold during freewheeling. By measuring one of these parameters and comparing it against a saturation threshold, the position of the rotor may be determined.

If the same saturation threshold is used with mass produced motors, tolerances in the electromagnetic properties of each motor may mean that the predetermined position of the rotor cannot be reliably determined. Additionally, the inductance of the phase winding may be sensitive to changes in the temperature of the motor, particularly the rotor. Since the inductance of the phase winding influences the rates at which the phase current rises and falls during excitation and freewheeling, the position of the rotor may be poorly determined if a fixed saturation threshold is used and the temperature of the motor changes. By measuring the parameter at a time when the stator is not saturated and then subtracting a fixed offset value from the measured parameter, a saturation threshold is obtained that is unique to each motor and is sensitive to changes in the temperature of the motor. As a result, the position of the rotor may be more reliably determined.

The saturation threshold may be defined by subtracting a fixed offset value from the measured parameter. This then has the advantage that the method may be implemented using a relatively simple and cheap controller.

In response to determining that the rotor is at the predetermined position, the method may comprise commutating the phase winding after a commutation period has elapsed. The saturation threshold may be defined such that the measured parameter is less that the saturation threshold only when the rotor is at or very near the aligned position. The method would then comprise commutating the phase winding immediately when the measured parameter is less than the saturation threshold. However, a difficulty with this approach is that, if the saturation threshold is set too low, the method may fail to detect that the measured parameter is less than the saturation threshold and thus miss the aligned position altogether. The saturation threshold may therefore be defined as a higher value such that the measured parameter is less than the saturation threshold after the rotor rotates through a smaller angle. For example, the saturation threshold may be defined such that the measured parameter is less than the saturation threshold after the rotor rotates through 160 electrical degrees rather than 180 electrical degrees. The commutation period is then defined such that the rotor rotates through the remaining angle, e.g. 20 electrical degrees. As a result, the phase winding is commutated at the aligned position. By employing a higher saturation threshold (i.e. one that corresponds to, say, 160 electrical degrees rather than 180 electrical degrees), the method is less likely to miss a saturation event (i.e. the point at which the measured parameter is less than the saturation threshold). As a result, the phase winding is commutated more reliably at the aligned position.

For a fixed commutation period, the corresponding electrical angle will depend on the speed of the rotor. Accordingly, the length of the commutation period may depend on the speed of the rotor. This does not necessarily mean that the method comprises measuring the speed of the rotor. For example, the method may be used to control the motor during acceleration of the rotor and the method may comprise decreasing the commutation period after each commutation.

BRIEF DESCRIPTION OF THE DRAWINGS

In order that the present invention may be more readily understood, embodiments of the invention will now be described, by way of example, with reference to the accompanying drawings, in which:

FIG. 2 details the allowed states of an inverter in response to control signals issued by a controller of the permanent-magnet motor.

DETAILED DESCRIPTION OF THE INVENTION

Figure 1:
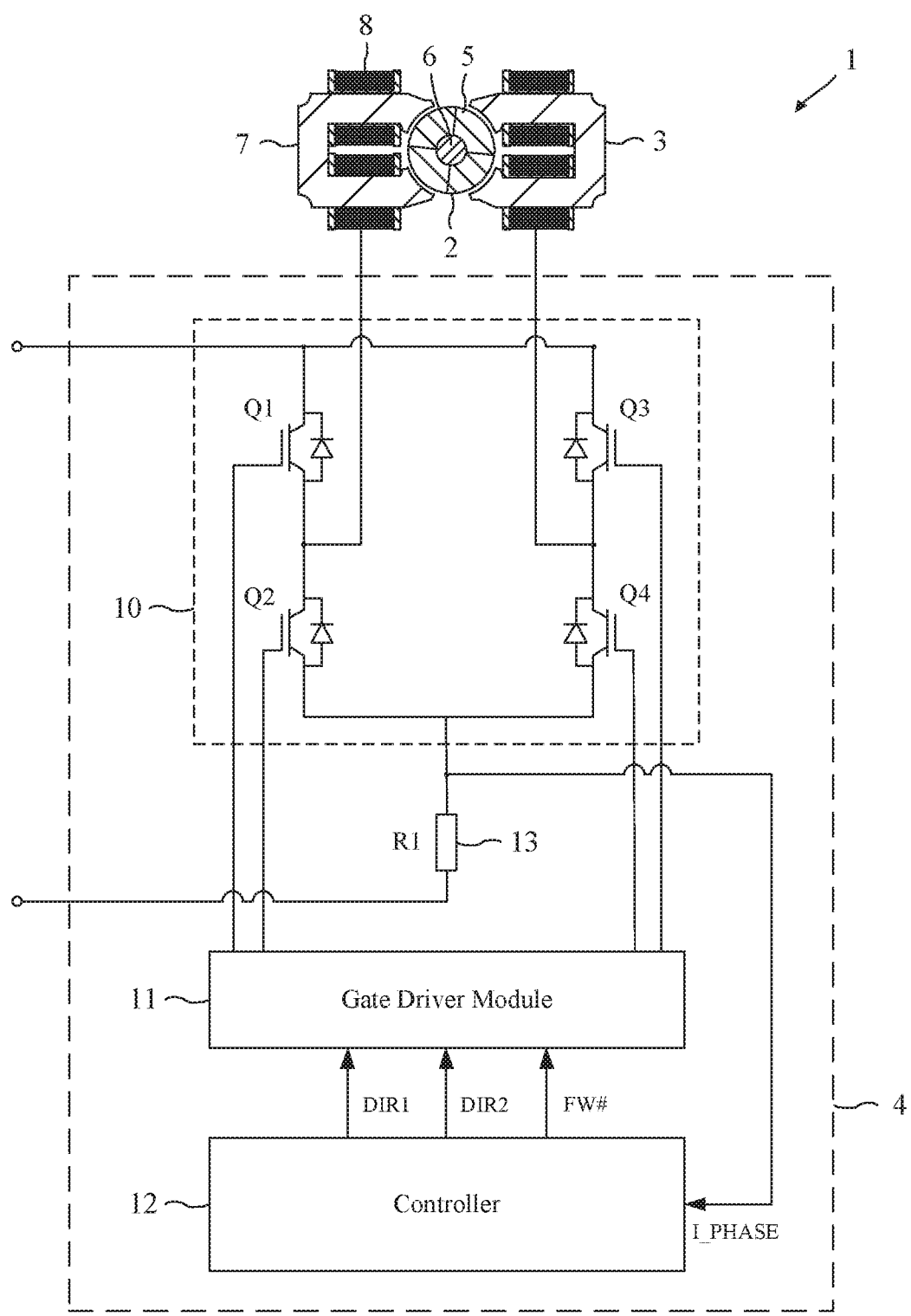
FIG. 1 is a schematic diagram of a permanent-magnet motor in accordance with the present invention.

The permanent-magnet motor 1 of FIG. 1 comprises a rotor 2, a stator 3, and a control system 4.

The rotor 2 comprises a four-pole permanent magnet 5 secured to a shaft 6. The stator 3 comprises a pair of cores 7 having four salient poles, and a phase winding 8 wound about the cores 7.

The control system 4 comprises an inverter 10, a gate driver module 11, a controller 12, and a current sensor 13.

The inverter 10 comprises a full bridge of four power switches Q1-Q4 that couple the phase winding 8 to the voltage rails of a power supply (not shown).

The gate driver module 11 drives the opening and closing of the switches Q1-Q4 in response to control signals output by the controller 12.

The controller 12 is responsible for controlling the operation of the motor 1 and generates three control signals: DIR1, DIR2, and FW#. The control signals are output to the gate driver module 11, which in response drives the opening and closing of the switches Q1-Q4.

When DIR1 is pulled logically high and DIR2 is pulled logically low, the gate driver module 11 closes switches Q1 and Q4, and opens switches Q2 and Q3. As a result, a voltage having a first polarity is applied to the phase winding 8, causing current to be driven through the phase winding 8 from left to right. Conversely, when DIR2 is pulled logically high and DIR1 is pulled logically low, the gate driver module 11 closes switches Q2 and Q3, and opens switches Q1 and Q4. As a result, a voltage having a second, opposite polarity is applied to the phase winding 8, causing current to be driven through the phase winding 8 from right to left. DIR1 and DIR2 therefore control the polarity of the voltage that is applied to the phase winding 8 and thus the direction of current through the phase winding 8. If both DIR1 and DIR2 are pulled logically low, the gate drive module 11 opens all switches Q1-Q4.

When FW# is pulled logically low, the gate driver module 11 opens both high-side switches Q1,Q3. Current in the phase winding 8 then circulates or freewheels around the low-side loop of the inverter 10 in a direction defined by DIR1 and DIR2. Each switch Q1-Q4 conducts in a single direction only but includes a body diode. The current that freewheels around the low-side loop of the inverter 10 therefore flows through one of the low-side switches Q2,Q4 and through the body diode of the other low-side switch Q2,Q4. Certain types of power switch are capable of conducting in both directions when closed. In this instance, when FW# is pulled logically low, both low-side switches Q2,Q4 may be closed such that current flows through both of the switches Q2,Q4 rather than through one of the body diodes.

FIG. 2 summarises the allowed states of the switches Q1-Q4 in response to the control signals of the controller 12. Hereafter, the terms 'set' and 'clear' will be used to indicate that a signal has been pulled logically high and low respectively.

The current sensor 13 comprises a sense resistor R1 located between the inverter 10 and the zero voltage rail. The voltage across the current sensor 13 provides a measure of the phase current (i.e. the current in the phase winding 8) when either DIR1 or DIR2 is set. The voltage across the current sensor 13 is output to the controller 12 as signal I_PHASE.

Start Up

When the rotor 2 is stationary, the controller 12 excites the phase winding 8 in a predetermined sequence that ensures that, irrespective of the position in which the rotor 2 has parked, the rotor 2 is driven in a forwards direction. For example, the controller 12 may employ the start-up scheme described in WO2013/132249. The particular scheme employed by the controller 12 in order to start the rotor 2 is not pertinent to the present invention.

Acceleration

Once the rotor 2 is moving forwards, the controller 12 employs a control scheme to accelerate the rotor 2.

The controller 12 begins by exciting the phase winding 8 in a direction that continues to drive the rotor 2 forwards. So, for example, the controller 12 may set DIR1 and clear DIR2 so as to excite the phase winding 8 from left to right. The particular direction of excitation will depend on the scheme that is employed at start up.

During excitation, the controller 12 monitors the magnitude of the phase current via the I_PHASE signal. When the phase current exceeds an upper threshold, the controller 12 freewheels the phase winding 8 by clearing FW#. Freewheeling continues for a fixed freewheel period, during which time the phase current decays. At the end of the freewheel period, the controller 12 again excites the phase winding 8 by setting FW#. Additionally, the controller 12 measures the phase current via the I_PHASE signal. This measurement corresponds to the magnitude of the phase current at the end of the freewheel period. The controller 12 compares the measured phase current against a saturation threshold. If the phase current is less than the saturation threshold, the controller 12 determines that the rotor 2 is at a predetermined angular position. Otherwise, the controller 12 determines that the rotor 2 is not yet at the predetermined position.

If the controller 12 determines that the rotor 2 is not yet at the predetermined position, the controller 12 repeats the above process. In particular, the controller 12 monitors the magnitude of the phase current during excitation, and freewheels the phase winding 8 when the phase current exceeds the upper threshold. Freewheeling continues for the freewheel period, after which the controller 12 again excites the phase winding 8 and measures the phase current. The controller 12 then compares the measured phase current against the saturation threshold, and determines that the rotor 2 is at the predetermined angular position if the phase current is less than the saturation threshold. Otherwise, the controller 12 once again repeats the process.

If the controller 12 determines that the rotor 2 is at the predetermined position, the controller 12 continues to sequentially excite and freewheel the phase winding 8 for a period of time that will hereafter be referred to as the commutation period. The controller 12 therefore monitors the magnitude of the phase current during excitation, and freewheels the phase winding 8 when the phase current exceeds the upper threshold. Freewheeling continues for the freewheel period, after which the controller 12 again excites the phase winding 8. However, in contrast to the process described above, the controller 12 no longer compares the phase current against the saturation threshold. Instead, the controller 12 continues to excite and freewheel the phase winding 8 until the commutation period has elapsed, at which point the controller 12 commutates the phase winding 8. Commutation involves reversing the direction of current through the phase winding 8. The controller therefore toggles DIR1 and DIR2 and sets FW#. In the present example, DIR1 was set initially such that current was driven through the phase winding 8 from left to right. Commutation therefore involves clearing DIR1, setting DIR2 and setting FW# such that current is now driven through the phase winding 8 in a direction from right to left.

The controller 12 therefore sequentially excites and freewheels the phase winding 8. The phase winding 8 is excited until the phase current exceeds an upper threshold, at which point the phase winding 8 is freewheeled for a fixed freewheel period. At the end of the freewheel period, the controller 12 measures the phase current and compares this against a saturation threshold in order to determine if the rotor 2 is at a predetermined position. Upon determining that the rotor 2 is at the predetermined position, the controller 12 continues to sequentially excite and freewheel the phase winding 8 for a commutation period, after which the controller 12 commutates the phase winding 8.

Upon commutating the phase winding 8, the controller 12 repeats the above process but with a shorter commutation period, the reasons for which are explained below. With the exception of a shorter commutation period, the process employed by the controller 12 is unchanged. The controller 12 continues in this manner until the controller 12 has commutated the phase winding 8 a set number of times (e.g. seven). At this point, the rotor 2 is assumed to have accelerated to a particular speed and the controller 12 switches to an alternative scheme in order to further accelerate the rotor 2. For example, the controller 12 may employ the acceleration scheme described in WO2013/132249.

The control scheme employed by the controller 12 makes use of magnetic saturation in order to determine the position of the rotor 2. As the permanent-magnet rotor 2 moves from a repulsive aligned position (rotor poles aligned with stator poles of same polarity) to an attractive aligned position (rotor poles aligned with stator poles of opposite polarity), the total flux linked by the stator core 7 increases. As the rotor 2 approaches the attractive aligned position, the stator core 7 begins to saturate and thus the inductance of the phase winding 8 decreases. As a result, the rates at which the phase current rises during excitation and falls during freewheeling increase. Since the phase winding 8 is freewheeled for a fixed period of time, the magnitude of the phase current at the end of each freewheel period decreases as the rotor 2 approaches the aligned position and is at a minimum when the rotor 2 is at the aligned position.

The controller 12 compares the phase current at the end of the freewheel period against a saturation threshold. When the phase current is less than the saturation threshold, the controller 12 determines that the rotor 2 is at a predetermined position. The controller 12 attempts to commutate the phase winding 8 when the rotor 2 is at the aligned position, i.e. the controller 12 attempts to commutate the phase winding 8 in synchrony with transitions in the polarity of the back EMF induced in the phase winding 8 by the rotor 2. It would therefore seem appropriate to set the saturation threshold to a relatively low value such that the measured phase current is less than the saturation threshold only when the rotor 2 is at or very near the aligned position. The controller 12 would then immediately commutate the phase winding 8 on determining that the measured phase current is less than the saturation threshold. However, a difficulty with this approach is that the controller 12 may miss the aligned position of the rotor 2 altogether. This is particularly true if the same saturation threshold is used to control mass-produced motors, for which the electromagnetic properties are likely to differ from motor to motor. Rather than employing a saturation threshold that corresponds to the aligned position, the controller 12 instead employs a saturation threshold that corresponds to an angular position just before the aligned position. The rotor rotates through 180 electrical degrees (or 90 mechanical degrees in the present example) when moving between aligned positions. The saturation threshold is then set such that the measured phase current is less than the saturation threshold when the rotor rotates through approximately 160 electrical degrees (or 80 mechanical degrees). The commutation period is then set such that the rotor rotates through approximately 20 electrical degrees (or 10 mechanical degrees) during the commutation period. As a result, the phase winding 8 is commutated at the aligned position. By employing a higher saturation threshold (i.e. one that corresponds to 160 electrical degrees rather than 180 electrical degrees), the controller 12 is less likely to miss a saturation event (i.e. the point at which the measured phase current is less than the saturation threshold). As a result, the controller 12 commutates the phase winding 8 more reliably at the aligned position.

It will be appreciated that the rotor 2 is unlikely to be at exactly 160 electrical degrees when the measured phase current is less than the saturation threshold, and the rotor 2 is unlikely to have moved through exactly 20 electrical degrees during the commutation period. One reason for this is that the controller 12 only measures the phase current at the end of each freewheel period. So the controller 12 is only able to determine if the rotor 2 is at the predetermined position after each excitation and freewheel period. In the embodiment described above, the saturation threshold is set to a value such that the measured phase current is less than the saturation threshold after the rotor 2 rotates through 160 electrical degrees. It will be appreciated that the saturation threshold may be set to an alternative value, so long as the corresponding angular position is within the region over which saturation of the stator core 7 occurs. If the saturation threshold is set too high, the controller 12 may incorrectly determine that the rotor 2 is at the predetermined position when it is not, i.e. the measured phase current may be less than the saturation threshold when the rotor 2 is still within the non-saturated region. Conversely, if the saturation threshold is set too low, the controller 12 may miss the predetermined position altogether, i.e. the measured phase current is never less than the saturation threshold.

Figure 3:
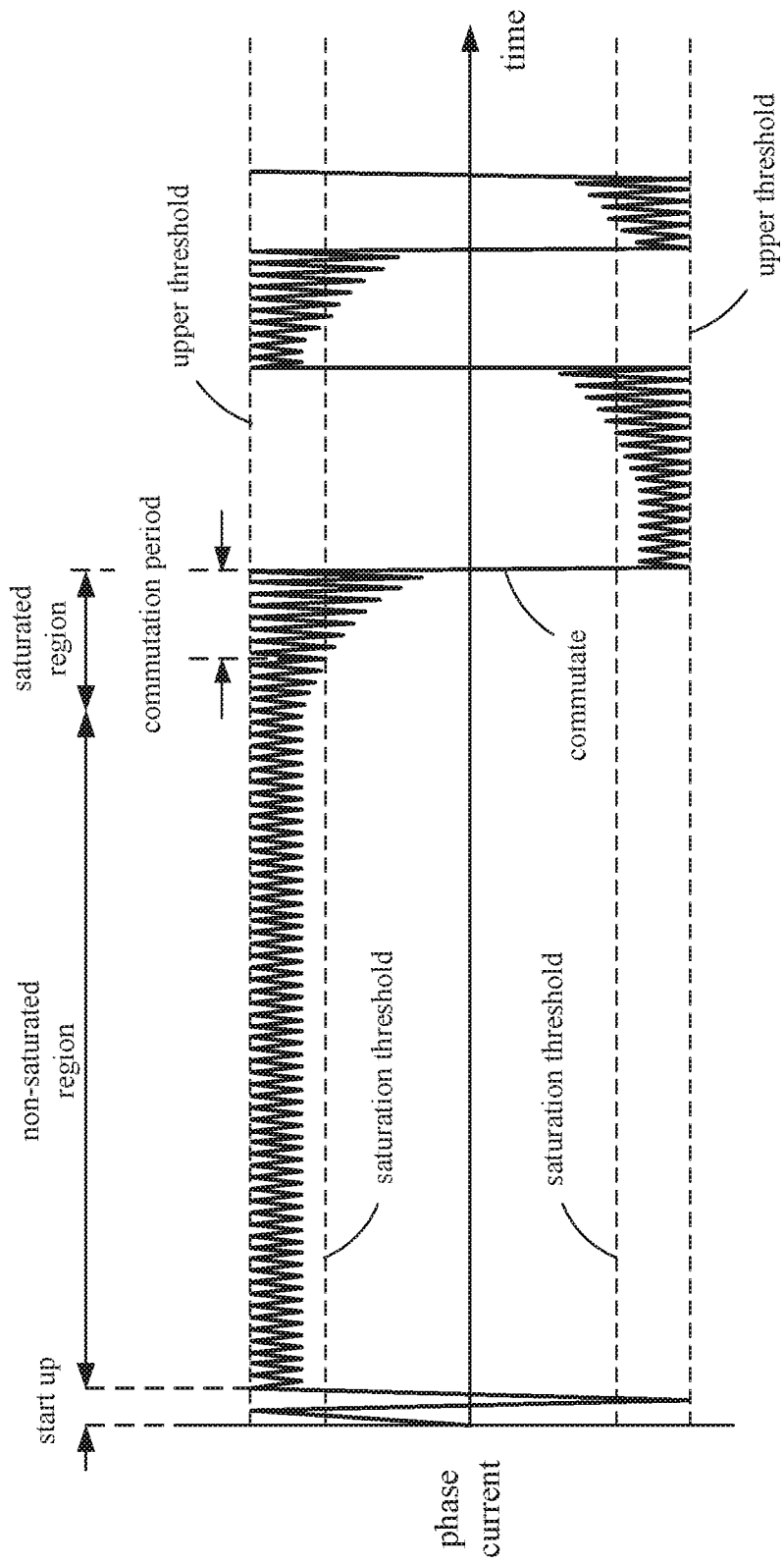
FIG. 3 illustrates the phase current of the permanent-magnet motor during start up and initial acceleration.

FIG. 3 illustrates how the phase current varies with time during start up and over the first few electrical half-cycles during acceleration.

As explained above, the commutation period is set such that the rotor 2 moves through approximately 20 electrical degrees during each commutation period. If the commutation period were fixed, the corresponding electrical angle would increase as the rotor 2 accelerates. It is for this reason that the controller 12 decreases the commutation period after each commutation. The rotor 2 accelerates in a well-characterised manner As a result, the controller 2 is able to employ a commutation period that depends on the number of commutations that have occurred since start up. This then simplifies the control scheme employed by the controller 12. For example, the controller 12 may store a lookup table of commutation periods that are indexed in sequence according to the commutation number. Nevertheless, the controller 12 may employ an alternative method to determine the commutation period. This is particularly true if the rotor 2 does not accelerate in a well-characterised manner, e.g. if the load on the rotor 2 at start up were to vary. By way of example, the controller 12 may measure the length of time between a commutation event (i.e. the point in time at which the controller 12 commutates the phase winding 8) and a saturation event (i.e. the point in time at which the controller determines that the phase current is less than the saturation threshold) in order to provide a measure of the speed of the rotor 2 and then use this time interval to define the commutation period. For example, if a saturation event occurred 1.6 ms after a commutation event, this would imply that the rotor 2 took 1.6 ms to rotate through 160 electrical degrees. The controller 12 would then employ a commutation period of 0.2 ms.

In the embodiment described above, the current sensor 13 comprises a single sense resistor R1, which has the benefit of reducing the component cost of the control system 4. As a consequence of having just one resistor, the current sensor 13 is capable of measuring the phase current during excitation only. During freewheeling, the phase current circulates around the low-side loop of the inverter 10 and bypasses the current sensor 13. It is for this reason that, in order to measure the phase current at the end of freewheeling, the controller 12 must first excite the phase winding 8. Conceivably, the current sensor 13 may comprise a pair of sense resistors, each resistor being located on a lower leg of the inverter 10. One of the resistors would then provide a measure of the phase current when the phase winding 8 is excited or freewheeled from left to right, and the other of the resistors would provide a measure of the phase current when the phase winding 8 is excited or freewheeled from right to left. The controller 12 could then measure the phase current at the end of freewheeling without first having to excite the phase winding 8. Moreover, rather than waiting until the end of the freewheel period, the controller 12 may continuously measure and compare the phase current against the saturation threshold during freewheeling. When the measured phase current is less than the saturation threshold, the controller 12 would start the commutation period without first waiting for the end of the freewheel period. Since the controller 12 compares the phase current against the saturation threshold throughout freewheeling, the position of the rotor 2 may be determined more accurately.

As the rotor 2 approaches the aligned position, the rate at which the phase current falls during freewheeling increases. The controller 12 then makes use of this feature in order to determine the position of the rotor 2. In particular, the controller 12 measures the magnitude of the phase current at the end of a fixed freewheel period and compares this against a saturation threshold. Rather than freewheeling the phase winding 8 for a fixed period of time, the controller 12 may instead freewheel the phase winding 8 until the phase current falls below a lower threshold. The controller 12 then excites the phase winding 8 until the phase current exceeds the upper threshold, at which point the controller 12 freewheels the phase winding 8. When the phase current subsequently falls below the lower threshold, the controller 12 again excites the phase winding 8. As a result, the phase current is chopped between the upper threshold and the lower threshold. In order to determine the position of the rotor 2, the controller 12 may measure the time interval between the start and the end of freewheeling (i.e. the time taken for the phase current to fall from the upper threshold to the lower threshold). Since the rate at which the phase current falls increases as the rotor 2 approaches the aligned position, the time interval between the start and the end of freewheeling will decrease. Alternatively, in order to determine the position of the rotor 2, the controller 12 may measure the time interval between the start and the end of excitation (i.e. the time taken for the phase current to rise from the lower threshold to the upper threshold). As the rotor 2 approaches the aligned position, not only does the phase current fall at a faster rate during freewheeling, but the phase current also rises at a faster rate during excitation. This can be seen in FIG. 3. Since the rate at which the phase current rises increases, the time interval between the start and the end of excitation will decrease as the rotor 2 approaches the aligned position. The controller 12 may therefore be said to measure a time interval between the start and end of freewheeling or between the start and end of excitation. In both instances, the controller 12 compares the measured time interval against a saturation threshold and determines that the rotor 2 is at the predetermined position when the time interval is less than the saturation threshold.

Saturation Threshold

As noted above, if the saturation threshold is set too high, the controller 12 may incorrectly determine that the rotor 2 is at the predetermined position when it is not. Conversely, if the saturation threshold is set too low, the controller 12 may miss the predetermined position altogether. It is therefore important that the saturation threshold is set to a value that is appropriate for the motor. When the motor is mass produced, it may be possible to use a single, common saturation threshold for all motors. Alternatively, it may be necessary or desirable to employ a saturation threshold that is unique to each motor. In both instances (i.e. irrespective of whether the saturation threshold is common or unique), the saturation threshold is fixed. However, there may be instances for which it is necessary or desirable to employ a variable saturation threshold.

The temperature of the rotor 2, and to a lesser extent the temperature of the phase winding 8, will influence the total flux that is linked to the stator core 7. As a result, the inductance of the phase winding 8 is sensitive to changes in the temperature of the motor 1. Since the inductance of the phase winding 8 influences the rates at which the phase current rises and falls during excitation and freewheeling, the controller 12 may incorrectly determine the position of the rotor 2 if a fixed saturation threshold is used and the temperature of the motor 1 changes. The controller 12 may therefore employ a saturation threshold that depends on the temperature of the motor 1. For example, the control system 4 may comprise a temperature sensor and the controller 12 may select a saturation threshold that depends on the output of the temperature sensor. This particular implementation would, however, increase the component cost of the control system 4. Instead, as will now be explained, the controller 12 employs a method of defining a saturation threshold that is sensitive to changes in the temperature of the motor 1 without the need for a temperature sensor.

As noted above, on entering acceleration mode, the controller 12 begins by exciting the phase winding 8 in a direction that continues to drive the rotor 2 forwards. So, for example, the controller 12 sets DIR1 and clears DIR2 so as to excite the phase winding 8 from left to right. The controller 12 continues to excite the phase winding 8 until the phase current exceeds the upper threshold, at which point the controller 12 freewheels the phase winding 8 for the fixed freewheel period. At the end of the freewheel period, the controller 12 measures the phase current. This measurement represents the very first measurement of the phase current on entering acceleration mode. Consequently, the measurement is made at a time when the rotor 2 is still within the non-saturated region. The controller 12 then subtracts a fixed offset value from the measured phase current and stores the result as the saturation threshold.

The inductance of the phase winding 8 is sensitive to changes in the temperature of the motor 1. This is true irrespective of whether the stator core 7 is saturated or non-saturated. Accordingly, whilst the magnitude of the phase current at the end of each freewheel period is roughly the same when operating with the non-saturated region, the magnitude of the phase current is nevertheless sensitive to changes in the temperature of the motor 1. Accordingly, by measuring the phase current in the non-saturated region and subtracting a fixed offset value, a saturation threshold is obtained that is sensitive to changes in the temperature of the motor 1. Importantly, the saturation threshold is obtained without the need for a temperature sensor, thus reducing the component cost of the control system 4.

Subtracting a fixed offset value from the measured phase current has been found to work well. Nevertheless, the controller 12 could conceivably use the measured phase current to obtain the saturation threshold in other ways. For example, the controller 12 could store a lookup table of different saturation thresholds and then use the measured phase current to select a saturation threshold from the lookup table. Alternatively, the controller 12 could solve an equation that defines the saturation threshold as a function of the measured phase current. Accordingly, in a more general sense, the controller 12 may be said to use the measured phase current in order to obtain the saturation threshold. Subtracting a fixed offset value from the measured phase current does, however, have the advantage that it may be implemented using a relatively simple and cheap controller. It is not, for example, necessary for the controller to solve a complex equation or comprise additional memory for a lookup table.

In the embodiment just described, the controller 12 measures the phase current at the end of the freewheel period and subtracts a fixed offset value in order to obtain the saturation threshold. However, as noted above, rather than the measuring the phase current at the end of a fixed freewheel period, the controller 12 may instead measure the time interval between the start and end of freewheeling or the start and end of excitation when the phase current is chopped between an upper threshold and a lower threshold. The process for obtaining the saturation threshold in this instance is essentially the same. In particular, the controller 12 makes a first measurement of the time interval, and subtracts a fixed offset value to define the saturation threshold.

Existing methods for determining the position of the rotor 2 often rely on measuring transitions in the polarity of the back EMF induced in the phase winding 8 by the rotor 2. However, at relatively low speeds, the magnitude of the back EMF is relatively small and thus transitions in the polarity of the back EMF cannot always be reliably measured. The control scheme employed by the controller 12 does not rely on the back EMF in order to determine the position of the rotor 2. Instead, the control scheme makes use of changes in the inductance of the phase winding 8 that arise as the rotor 2 rotates from one aligned position to the next aligned position. As a result, the controller 12 is able to determine the position of the rotor 2 more reliably when rotating at relatively low speeds.

The controller 12 assesses whether the rotor 2 is at the predetermined position (i.e. compares the measured parameter against the saturation threshold) with each chop of the phase current. The frequency of current chopping (i.e. the number of times that the winding is excited and freewheeled) therefore defines the resolution with which the position of the rotor 2 is determined. At relatively low rotor speeds, the controller 12 typically chops the phase current many times over each electrical half-cycle and thus the position of the rotor 2 may be determined with relatively good accuracy. As the speed of the rotor 2 increases, the length of each electrical half-cycle decreases and thus the controller 12 chops the phase current less frequently. As a result, the accuracy with which the position of the rotor 2 is determined decreases. Eventually, a speed is reached where the accuracy of the rotor position is relatively poor. It is for this reason that the controller 12 switches to a different scheme in order to further accelerate the rotor 2.

The controller 12 commutates the phase winding 8 a set number of times (e.g. seven), after which the controller 12 switches to an alternative scheme in order to further accelerate the rotor 2. However, the controller 12 could conceivably switch to the alternative scheme after commutating the phase winding 8 just once. In other words, after commutating the phase winding 8 just once, the rotor 2 may be moving sufficiently quickly that the controller 12 may switch to the alternative scheme in order to further accelerate the rotor. In this instance, the controller 12 need store a single commutation period only.

In the embodiments described above, the control scheme is employed purely to accelerate the rotor 2 at relatively low speeds. Conceivably, the control scheme may be used to control a motor under steady state conditions. The only requirement is that, when operating at a steady state, the phase current is chopped at a sufficient frequency that the position of the rotor 2 can be determined with sufficient accuracy. The time spent in acceleration mode is relatively short. Accordingly, when employing a variable saturation threshold, it is sufficient to calculate the saturation threshold just once. If, however, the control scheme were used to control a motor under steady state conditions, it may be necessary or desirable to calculate the saturation threshold more frequently, e.g. after each commutation or after every nth commutation.

Upon commutating the phase winding 8, the controller 12 repeats the above process but with a shorter commutation period, the reasons for which are explained below. With the exception of a shorter commutation period, the process employed by the controller 12 is unchanged. The controller 12 continues in this manner until the controller 12 has commutated the phase winding 8 a set number of times. At this point, the rotor 2 is assumed to have accelerated to a particular speed and the controller 12 switches to an alternative scheme in order to further accelerate the rotor 2. For example, the controller 12 may employ the acceleration scheme described in WO2013/132249.

The control scheme described above employs both a commutation period and a variable saturation threshold. However, it is not essential that the control scheme employs both. For example, as noted above, the control scheme may employ a fixed saturation threshold, e.g. one that is common to all motors or one that is unique to each motor. Nevertheless, by employing a commutation period in combination with a higher saturation threshold, albeit one that is fixed, the controller 12 is less likely to miss a saturation event. Equally, the control scheme may employ a variable saturation threshold without the need for a commutation period. Since the controller 12 attempts to commutate the phase winding 8 when the rotor 2 is at the aligned position, the saturation threshold may be set sufficiently low such that the measured parameter is less that the saturation threshold only when the rotor 2 is at or very near the aligned position. The controller 12 would then immediately commutate the phase winding 8 when the measured parameter is less than the saturation threshold. As explained above, a difficulty with this approach is that, if the saturation threshold is set too low, the controller 12 may miss a saturation event altogether. This is particularly true when the same saturation threshold is used to control mass-produced motors. However, by employing a saturation threshold that is not only unique to each motor but is unique with each start-up of the motor, a saturation event may be determined with much greater reliability. As a result, it may be possible to control the motor without the need for a commutation period.

The invention claimed is:

1. A method of determining the position of a rotor of a brushless permanent-magnet motor, the method comprising:
exciting and freewheeling a phase winding of the motor, wherein the phase winding is freewheeled when a phase current exceeds an upper threshold and freewheeling comprises freewheeling until the phase current falls below a lower threshold;
measuring a first time interval between the start and end of freewheeling or the start and end of excitation, wherein the first time interval is measured using a controller, and wherein the first time interval begins when the phase current exceeds the upper threshold and ends when the phase current falls below the lower threshold;
using the measured first time interval to define a saturation threshold, wherein the saturation threshold is defined such that when the measured first time interval is less than the saturation threshold, the rotor is in a pre-determined position;
sequentially exciting and freewheeling the phase winding using the controller, wherein the controller outputs control signals to sequentially excite and freewheel the phase winding, wherein the phase winding is freewheeled when the phase current exceeds the upper threshold and freewheeling comprises freewheeling until the phase current falls below the lower threshold;
measuring a second time interval corresponding to the time interval between either the start and end of freewheeling or the start and end of excitation, wherein the second time interval is measured using the controller, and wherein the second time interval begins when the phase current exceeds the upper threshold and ends when the phase current falls below the lower threshold;
comparing the measured second time interval against the saturation threshold using the controller; and
determining, using the controller, that the rotor is at a predetermined position when the measured second time interval is less than the saturation threshold.

2. The method of claim 1, wherein using the measured first time interval to define the saturation threshold comprises subtracting a fixed offset value from the measured first time interval.

3. The method of claim 1, wherein, in response to determining that the rotor is at the predetermined position, the method comprises commutating the phase winding after a commutation period has elapsed, wherein the commutation period includes a period of time after the determination that the rotor is in the predetermined position wherein the phase winding continues to be sequentially excited and freewheeled.

4. The method of claim 3, wherein the length of the commutation period depends on the speed of the rotor.

5. A control system for a permanent-magnet motor, the control system configured to perform the method in claim 1.

6. The control system of claim 5, wherein the control system comprises an inverter, a gate driver module, a controller, and a current sensor, the inverter is coupled to the phase winding, the gate driver module drives the opening and closing of switches of the inverter in response to control signals output by the controller, and the current sensor outputs a signal to the controller that provides a measure of the phase current, and the controller outputs the control signals to sequentially excite and freewheel the phase winding compares the measured second time interval against the saturation threshold, and determines that the rotor is at a predetermined position when the measured second time interval is less than the saturation threshold.

7. A method of determining the position of a rotor of a brushless permanent-magnet motor, the method comprising:
exciting and freewheeling a phase winding of the motor, wherein the phase winding is freewheeled when a phase current exceeds an upper threshold and freewheeling comprises freewheeling for a fixed period of time;
measuring a parameter corresponding to a first magnitude of the phase current using a controller, during or at the end of freewheeling, wherein the end of freewheeling occurs when the fixed period of time has expired after the phase current exceeds the upper threshold;
using the measured parameter corresponding to a first magnitude of the phase current to define a saturation threshold, wherein the saturation threshold is defined such that when the measured parameter is less than the saturation threshold, the rotor is in a pre-determined position;
sequentially exciting and freewheeling the phase winding, wherein the phase winding is excited and freewheeled using the controller, wherein the controller outputs control signals to sequentially excite and freewheel the phase winding, wherein the phase winding is freewheeled when the phase current exceeds the upper threshold and freewheeling comprises freewheeling for the fixed period of time;
measuring a parameter corresponding to a second magnitude of the phase current during or at the end of freewheeling;
comparing the measured parameter against the saturation threshold using the controller; and determining, using the controller, that the rotor is at a predetermined position when the measured parameter is less than the saturation threshold.

8. The method of claim 7, wherein using the measured parameter corresponding to the first magnitude of the phase current to define the saturation threshold comprises subtracting a fixed offset value from the measured parameter corresponding to the first magnitude of the phase current.

9. The method of claim 7, wherein, in response to determining that the rotor is at the predetermined position, the method comprises commutating the phase winding after a commutation period has elapsed, wherein the commutation period includes a period of time after the determination that the rotor is in the predetermined position wherein the phase winding continues to be sequentially excited and freewheeled.

10. The method of claim 9, wherein the length of the commutation period depends on the speed of the rotor.

11. A control system for a permanent-magnet motor, the control system configured to perform the method in claim 7.

12. The control system of claim 11, wherein the control system comprises an inverter, a gate driver module, a controller, and a current sensor, the inverter is coupled to the phase winding, the gate driver module drives the opening and closing of switches of the inverter in response to control signals output by the controller, and the current sensor outputs a signal to the controller that provides a measure of the phase current and the controller outputs the control signals to sequentially excite and freewheel the phase winding, compares the measured parameter corresponding to the second magnitude of the phase current against the saturation threshold, and determines that the rotor is at a predetermined position when the measured parameter corresponding to the second magnitude of the phase current is less than the saturation threshold.

* * * * *